(12) United States Patent
Ranta-aho et al.

(10) Patent No.: US 7,965,679 B2
(45) Date of Patent: Jun. 21, 2011

(54) METHOD, APPARATUS AND COMPUTER PROGRAM PROVIDING SIGNALING OF ZERO/FULL POWER ALLOCATION FOR HIGH SPEED UPLINK PACKET ACCESS (HSUPA)

(75) Inventors: Karri Ranta-aho, Espoo (FI); Benoist Sébire, Beijing (CN)

(73) Assignee: Nokia Corporation, Espoo (FI)

(*) Notice: Subject to any disclaimer, the term of this patent is extended or adjusted under 35 U.S.C. 154(b) by 262 days.

(21) Appl. No.: 11/432,980

(22) Filed: May 11, 2006

(65) Prior Publication Data
US 2006/0268773 A1 Nov. 30, 2006

Related U.S. Application Data

(60) Provisional application No. 60/680,266, filed on May 11, 2005.

(51) Int. Cl.
*H04W 4/00* (2009.01)
(52) U.S. Cl. ...................................................... 370/329
(58) Field of Classification Search .................. 370/329, 370/400, 328, 278, 242, 336, 280; 455/452.1, 455/450, 522, 451, 436–439
See application file for complete search history.

(56) References Cited

U.S. PATENT DOCUMENTS

| 7,447,504 B2 * | 11/2008 | Lohr et al. ..................... 455/450 |
| 2003/0103476 A1 * | 6/2003 | Choi et al. ..................... 370/329 |
| 2004/0090916 A1 | 5/2004 | Hosein .......................... 370/235 |
| 2004/0141525 A1 | 7/2004 | Bhushan et al. ............... 370/473 |
| 2005/0220042 A1 * | 10/2005 | Chang et al. .................. 370/278 |
| 2007/0281688 A1 * | 12/2007 | Tajima .......................... 455/433 |

FOREIGN PATENT DOCUMENTS

| KR | 2001-0110537 | | 12/2001 |
| KR | 2001-110537 A | * | 12/2001 |
| WO | WO 99/65158 | | 12/1999 |
| WO | WO-99/65158 A1 | * | 12/1999 |
| WO | WO-01/43296 A2 | * | 6/2001 |

(Continued)

OTHER PUBLICATIONS

Seong-Jun Oh, Danlu Zhang, Kimberly M. Wasserman, "Optimal Resource Allocation in Multiservice CDMA Networks", IEEE Transactions on Wireless Communications, vol. 2, No. 4, Jul. 2003, pp. 811-821.

(Continued)

*Primary Examiner* — Melody Mehrpour
(74) *Attorney, Agent, or Firm* — Harrington & Smith (57) ABSTRACT

A network schedules a mobile station for an uplink packet transmission on a data channel, receives from a mobile station an uplink message on a control channel, determines from the uplink message a desired power for the mobile station to transmit on the data channel, and thereafter transmits to the mobile station a power control message that commands either a zero power allocation or a full power allocation for the scheduled uplink packet transmission. The mobile station receives from the network the power control message, then determines from the power control message whether zero or full power is allocated. If zero power, then the mobile station suspends its transmissions on the data channel until receiving a new power control command for uplink transmissions on the data channel. If full power, the mobile station transmits user data on the data channel without regard to power on a control channel.

40 Claims, 3 Drawing Sheets

FOREIGN PATENT DOCUMENTS

| WO | WO 01/43296 A2 | 6/2001 |
| WO | WO-03/028314 A1 * | 4/2003 |
| WO | WO 03/101134 A1 | 12/2003 |

OTHER PUBLICATIONS

3GPP TS 25.309 V6.2.0, "Technical Specification Group Radio Access Network, FDD Enhanced Uplink; Overall Description", Mar. 1, 2005, pp. 1-30, XP002990835.*

"3$^{rd}$ Generation Partnership Project; Technical Specification Group Radio Access Network, Medium Access Control (MAC) protocol specification (Release 6)", 3GPP TS 25.321 V6.4.0, Mar. 1, 2005, pp. 1-74.*

"3$^{rd}$ Generation Partnership Project; Technical Specification Group Radio Access Network; Medium Access Control (MAC) protocol specification (Release 6)", #GPP TS 25.321 V6.4.0 (Mar. 2005), pp. 1-74.

* cited by examiner

| ABS. GRANT VALUE | BIT SEQUENCE | INDEX No. |
|---|---|---|
| NO UPPER LIMIT | 11111 | 31 |
| $(168/15)^2 * 6$ | 11110 | 30 |
| $(150/15)^2 * 6$ | 11101 | 29 |
| $(168/15)^2 * 4$ | 11100 | 28 |
| $(150/15)^2 * 4$ | 11011 | 27 |
| $(134/15)^2 * 4$ | 11010 | 26 |
| $(119/15)^2 * 4$ | 11001 | 25 |
| $(150/15)^2 * 2$ | 11000 | 24 |
| $(95/15)^2 * 4$ | 10111 | 23 |
| $(168/15)^2$ | 10110 | 22 |
| $(150/15)^2$ | 10101 | 21 |
| $(134/15)^2$ | 10100 | 20 |
| $(119/15)^2$ | 10011 | 19 |
| $(106/15)^2$ | 10010 | 18 |
| $(95/15)^2$ | 10001 | 17 |
| $(84/15)^2$ | 10000 | 16 |
| $(75/15)^2$ | 01111 | 15 |
| $(67/15)^2$ | 01110 | 14 |
| $(60/15)^2$ | 01101 | 13 |
| $(53/15)^2$ | 01100 | 12 |
| $(47/15)^2$ | 01011 | 11 |
| $(42/15)^2$ | 01010 | 10 |
| $(38/15)^2$ | 01001 | 9 |
| $(34/15)^2$ | 01000 | 8 |
| $(30/15)^2$ | 00111 | 7 |
| $(27/15)^2$ | 00110 | 6 |
| $(24/15)^2$ | 00101 | 5 |
| $(19/15)^2$ | 00100 | 4 |
| $(15/15)^2$ | 00011 | 3 |
| $(11/15)^2$ | 00010 | 2 |
| $(7/15)^2$ | 00001 | 1 |
| ZERO GRANT | 00000 | 0 |

METHOD, APPARATUS AND COMPUTER PROGRAM PROVIDING SIGNALING OF ZERO/FULL POWER ALLOCATION FOR HIGH SPEED UPLINK PACKET ACCESS (HSUPA)

CROSS REFERENCE TO RELATED APPLICATION

This application claims priority to U.S. Provisional Patent Application Ser. No. 60/680,266, filed on May 11, 2005, and which is hereby incorporated by reference in its entirety.

TECHNICAL FIELD

The teachings of this invention relate generally to wireless communication systems and, more specifically, relate to digital wireless communications systems wherein transmissions on a wireless link from a user equipment (UE) to a network node is power controlled

BACKGROUND

The following abbreviations that appear below are defined as follows:
- DCH Dedicated Transport Channel
- DL Down Link (Node B to User Equipment)
- DPCCH Dedicated Physical Control CHannel
- E-AGCH E-DCH Absolute Grant Channel, carries DL scheduling control information
- E-DCH Enhanced (uplink) Dedicated CHannel
- E-DPCCH E-DCH Dedicated Physical Control CHannel, carries E-DPDCH related control information in the uplink
- E-DPDCH E-DCH Dedicated Physical Data CHannel, carries the E-DCH data packets in the uplink
- E-RGCH E-DCH Relative Grant Channel, carried DL scheduling control information
- FDD Frequency Division Duplex
- HSUPA High Speed Uplink Packet Access
- Node B WCDMA Base Transceiver Station
- RNC Radio Network Controller
- RRC Radio Resource Control
- UE User Equipment
- UL Up Link (User Equipment to Node B)
- WCDMA Wideband Code Division Multiple Access Generally, three nodes of the communication system are relevant to these teachings: the Radio Network Controller RNC, a Node B, and a user equipment UE. The Node B is interchangeably referred to as a base transceiver station BTS, and the UE is interchangeably referred to as a mobile station MS. The RNC and Node B are elements of the network, whereas the UE communicates with the network but is not considered a part thereof. Multiple Node Bs are typically under the control of one RNC, and typically multiple UEs are under the control of one Node B. Power control is an important feature in any packet-switched wireless system to enable multiple users to access the system simultaneously.

HSUPA involves enhancements of the uplink dedicated transport channel, hereafter referred to as E-DCH, for packet data traffic as per Release 6 of 3GPP. In HSUPA one enhancement of interest relates to distributing some of the packet scheduler functionality to the Node Bs. A reason for making this type of redistribution is to achieve a more rapid scheduling of bursty, non real-time traffic than can be accomplished using the Layer 3 (L3) of the RNC. The basic premise is that with faster link adaptation it is possible to more efficiently share the uplink power resource between packet data users. For example, when data packets have been transmitted from one UE the scheduled radio resource can be made available immediately to another UE. This approach avoids the peaked variability of noise rise, when high data rates are being allocated to users running bursty high data-rate applications.

In the current system-level architecture, the packet scheduler is located in the RNC and, therefore, is limited in its ability to adapt to the instantaneous traffic due at least to bandwidth constraints on the RRC signaling interface between the RNC and the UE. Hence, to accommodate the variability the packet scheduler is designed to be conservative in allocating uplink power in order to take into account the influence from inactive users in a next scheduling period. However, this conservative approach is spectrally inefficient for allocated high data-rates and long release timer values.

With E-DCH, much of the packet scheduler functionality is transferred to the Node B, i.e., there is defined a Node B packet scheduler that is responsible for allocating uplink radio resources among the UEs under its control.

For this type of scheduling to be performed efficiently, the Node B needs to obtain a data rate request from the UE. After a scheduling decision is made the Node B can inform the UE of the decision by sending absolute and relative grants. With an absolute grant (on the E-AGCH) a certain power is allocated for UE transmissions on the E-DCH packet data channel, specifically the E-DPDCH. This power is given relative to the DPCCH power (E-DPDCH/DPCCH power ratio). The Node B commands changes to power on the E-DPDCH uplink on relative grant channels using UP/KEEP/DOWN commands, which the UE responds to as follows: when the UE receives an UP command, the UE increases its transmit power allocation by a certain step size, and when the UE receives a DOWN command it reduces its power allocation by a certain step size. The absolute grant channel delivers the UE an absolute value for the E-DPDCH/DPCCH power ratio.

Currently, the E-DPDCH to DPCCH PO (power ratio between the E-DPDCH and DPCCH) is defined to be in the range of $-10, \ldots, +21$ dB, with a uniform 1 dB granularity, i.e., the uplink power control range is defined as 32, 1 dB steps. Each UP or DOWN command on the E-RGCH directs the UE to increase or decrease power by 1 dB on the E-DPDCH uplink.

The FDD Enhanced Uplink Stage 2; overall description (TS25.309), and the MAC specification (TS25.321) refer to a 'zero allocation', meaning that when the UE is signaled with a zero allocation then no transmission should take place. In the power domain the zero allocation would imply a E-DPDCH/DPCCH power ratio of minus infinity.

Additionally, it is noted that the uplink power dynamic range is limited in the current architecture to 31 dB, as noted above. Because the absolute grant for power on the E-DPDCH is given relative to the power on the DPCCH, there are instances where the maximum allowed power on the DPDCH of +21 dB over that on the DPCCH is insufficient when the power on the DPCCH is very low. Since power control in a wireless packet-switched system is dominated by proximity of the communicating entities, such instances would generally arise when the UE is relatively close to the Node B.

It is presently known that the E-AGCH channel uses five bits for the power ratio signaling, which results in the 32 possible different values ranging from $-10$ dB to $+21$ dB.

It is also known that the Node B (using E-AGCH and/or E-RGCH) must be capable of scheduling a 'zero allocation' to the UE, but how that is to be accomplished has not been specified. The basis of the discussion thus far among the 3GPP participants with which the inventors have met has been that the UE is scheduled with a data rate, and the lowest data rate would be zero bits per second (bps). To the inventors' knowledge, it has not yet been determined among the 3GPP participants how to implement such a 'no transmission' signaling to the UE.

SUMMARY

The foregoing and other problems are overcome, and other advantages are realized, in accordance with the presently described embodiments of these teachings.

In accordance with an exemplary embodiment of the invention, there is provided a method for operating a network element. In the method, user equipment is scheduled for an uplink packet transmission on a wireless data channel, and thereafter a message is transmitted to the user equipment that commands a zero power allocation for the scheduled uplink packet transmission.

In accordance with another exemplary embodiment of the invention, there is provided a program of machine-readable instructions, tangibly embodied on an information bearing medium and executable by a digital data processor, to perform actions directed toward providing a power control to a mobile station. After a user equipment is scheduled for an uplink packet transmission on a wireless data channel, the actions include accessing a storage medium to determine a bit sequence that is associated with a zero power allocation, and then transmitting to the user equipment a power control message for the scheduled uplink transmission that includes the determined bit sequence. The storage medium may store the data as a lookup table, and algorithm, or any such association of data strings.

In accordance with another exemplary embodiment of the invention, there is provided a network element that includes a transceiver coupled to a data processor and to a memory, where the memory is for storing a data association and computer instructions executable by the data processor. The data association includes an association of a first bit sequence with a zero power allocation. The executable computer instructions are for causing the transceiver to send a power control message comprising the first bit sequence to a user equipment that is scheduled for uplink packet transmission on a data channel.

In accordance with another exemplary embodiment of the invention, there is provided an apparatus that includes means for storing an association of bit sequences with power allocations, and means for transmitting in a power control message a first bit sequence to command a user equipment of a power allocation for an uplink data channel. In the means for storing, the first bit sequence is associated with a zero power allocation, and a second bit sequence is associated with a relative power allocation.

In accordance with another exemplary embodiment of the invention, there is provided a method for operating a mobile station. In this method, the mobile station receives from a network element a power control command for uplink transmissions on a data channel, and determines from that power control command a zero power allocation. The mobile station then suspends transmissions on the data channel until receiving a new power control command for uplink transmissions on the data channel.

In accordance with another exemplary embodiment of the invention, there is provided a mobile station that includes a transceiver coupled to a data processor and to a memory, the memory for storing a data association and computer instructions executable by the data processor. Upon receipt of a power control command for uplink transmissions on a data channel, the executable computer instructions are for causing the processor to determine from the power control command and the memory a zero power allocation. The instructions then cause the mobile station to suspend transmissions on the data channel until receiving a new power control command for uplink transmissions on the data channel.

In accordance with another exemplary embodiment of the invention, there is provided a program of machine-readable instructions, tangibly embodied on an information bearing medium and executable by a digital data processor, to perform actions directed toward controlling transmission power in a mobile station. The actions include receiving at a mobile station from a network element a power control command for uplink transmissions on a data channel, and determining from the power control command a zero power allocation. Then, the actions further include suspending transmissions on the data channel until receiving a new power control command for uplink transmissions on the data channel.

In accordance with another exemplary embodiment of the invention, there is provided an apparatus that includes means for storing an association of a first bit sequence with a zero power allocation, and means for accessing the means for storing with the first bit sequence received in a power control message to determine the zero power allocation for uplink transmissions on a data channel. Further, the apparatus includes means for suspending transmissions on the data channel until receiving a new power control command for uplink transmissions on the data channel.

In accordance with another exemplary embodiment of the invention, there is provided a method of allocating transmission power to a mobile station. In this method, a network schedules a mobile station for an uplink packet transmission on a data channel, receives from a mobile station an uplink message on a control channel, then determines from the uplink message a desired zero power for the mobile station to transmit on the data channel, and thereafter transmits to the user equipment a power control message that commands a zero power allocation for the scheduled uplink packet transmission. The mobile station receives from the network the power control message, then determines from the power control message a zero power allocation. Then, the method further includes the mobile station suspending its transmissions on the data channel until receiving a new power control command for uplink transmissions on the data channel.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

As noted above, embodiments of the invention relate to power control in wireless communications. There are numerous ways in which one might implement the 'no transmission' signaling noted above. Since the packet scheduler is being considered as being moved from the RNC to the Node B, one implementation might be that the Node B simply fails to schedule the particular UE for transmission on the E-DPDCH during the time no transmissions are to occur, or alternatively to signal the UE that a previous but unexpired grant of radio resources is canceled. The inventors have determined a different approach using the power control regime. Given the above background, it is determined that it would be advantageous for the Node B to signal the UE to transmit at zero power, or to transmit at a power not necessarily limited to no more than +21 dB. Neither is currently possible within the signaling regimen of HSUPA system. The teachings herein are not limited to a HSUPA system through.

Figure 1:
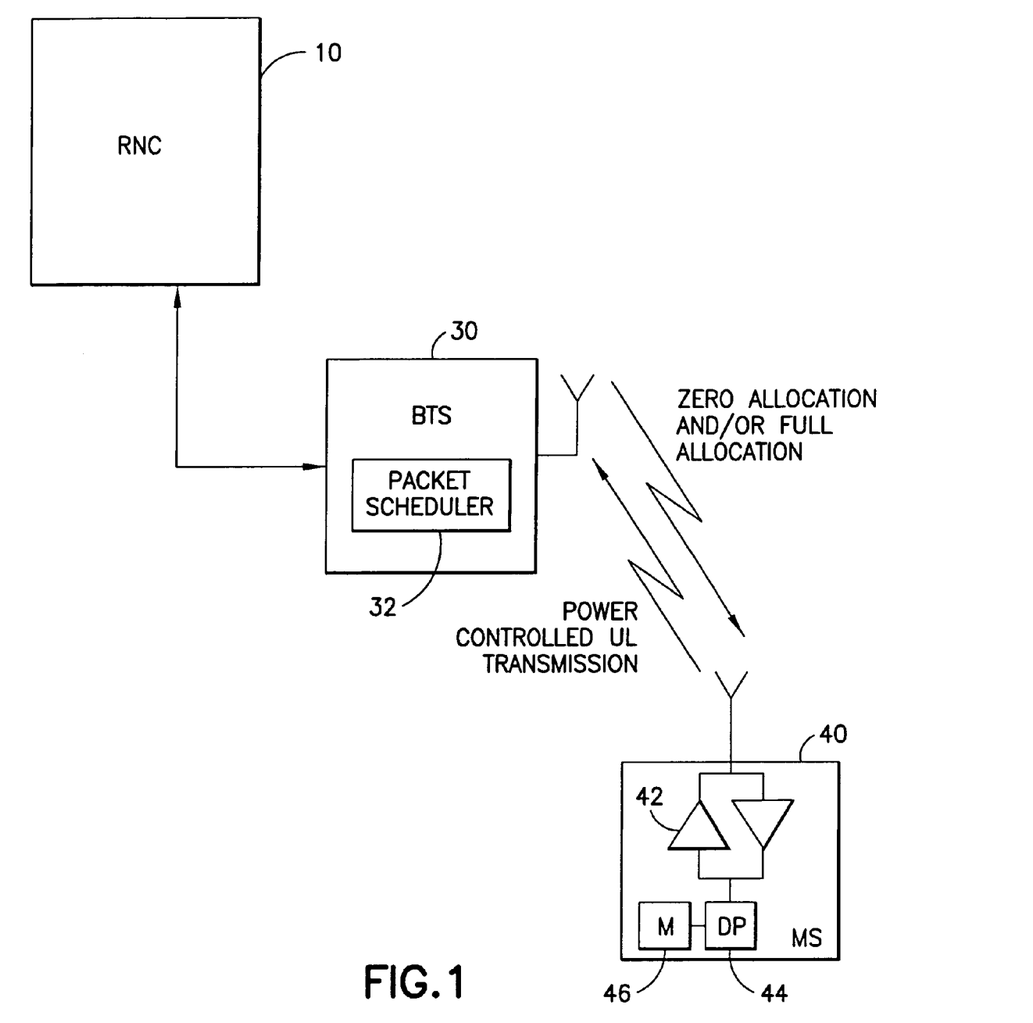
FIG. 1 is a system level block diagram illustrating components that operate in accordance with an embodiment of the invention.
Figure 2:
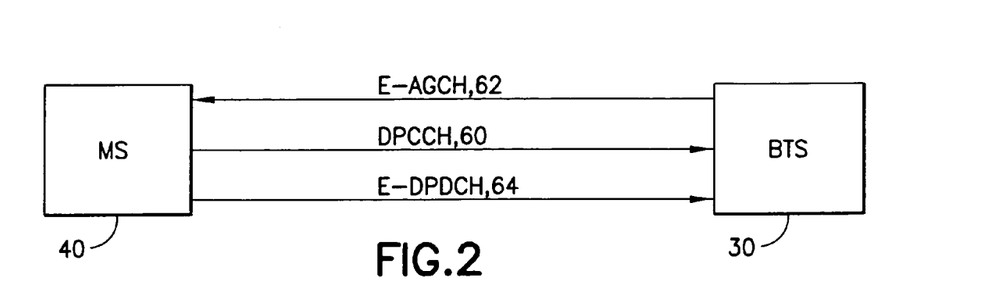
FIG. 2 shows exemplary downlink and uplink signaling and data flows between the UE and the Node B of FIG. 1.

The component blocks illustrated in FIG. 1 are functional and the functions described below may or may not be performed by a single physical component of the RNC 10, BTS 30, or MS 40 as described with reference to FIG. 1. Referring to FIGS. 1 and 2, a Radio Network Controller RNC 10 is coupled to a Node B or base transceiver station BTS 30, which in turn is coupled through wireless links to a User Equipment or mobile station MS 40. The MS 40 is assumed to include a wireless radio frequency (RF) transceiver 42, a data processor (DP) 44 and memory (M) 46 in which is stored a program for execution by the DP 44. The BTS 30 is assumed to also include a transceiver, a data processor and a memory, and the RNC is assumed to include a data processor and a memory as well. Computer programs stored in the various memories include program instructions for causing the associated data processors to operate in accordance with the exemplary embodiments of this invention. The BTS 30 is assumed to include a packet scheduler 32 that operates in accordance with the exemplary embodiments of this invention, although some or all of the packet scheduler functionality may reside in the RNC 10.

In general, the various embodiments of the MS 40 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The MS 40 wirelessly communicates with a wireless network such as a wireless local area network (LAN or WLAN) or a mobile telephony network that is coupled to a publicly switched telephone network. The mobile telephony network includes a plurality of BTSs 30 and at least one RNC 10, and the MS 40 is under the control of one BTS 30 at a time. In a WLAN or LAN, the network element with which the MS 40 communicates may be named differently but for the power control aspects of the invention it functions similar to the BTS 30 described herein, so long as the wireless network is packet-switched. The MS 40 is not considered part of the wireless network. The wireless communications capability is assumed to include a transmit function that is power controlled as discussed below.

In accordance with the non-limiting and exemplary embodiments of this invention, a specific bit pattern on the E-AGCH channel corresponds to a 'zero allocation' or 'No E-DCH transmission' for the MS 40. Further in accordance with the non-limiting and exemplary embodiments of this invention a specific bit pattern of the five bits currently used in 3GPP for signaling the E-DPDCH/DPCCH power ratio on the E-AGCH is reserved for this purpose.

Further in accordance with the non-limiting and exemplary embodiments of this invention, a specific bit pattern on the E-AGCH channel corresponds to a 'no power ratio limitation' or to 'Power ratio +xx dB or more'. Further in accordance with the non-limiting and exemplary embodiments of this invention a specific bit pattern of the five bits used for signaling the E-DPDCH/DPCCH power ratio on the E-AGCH is reserved for this purpose.

Figure 3:
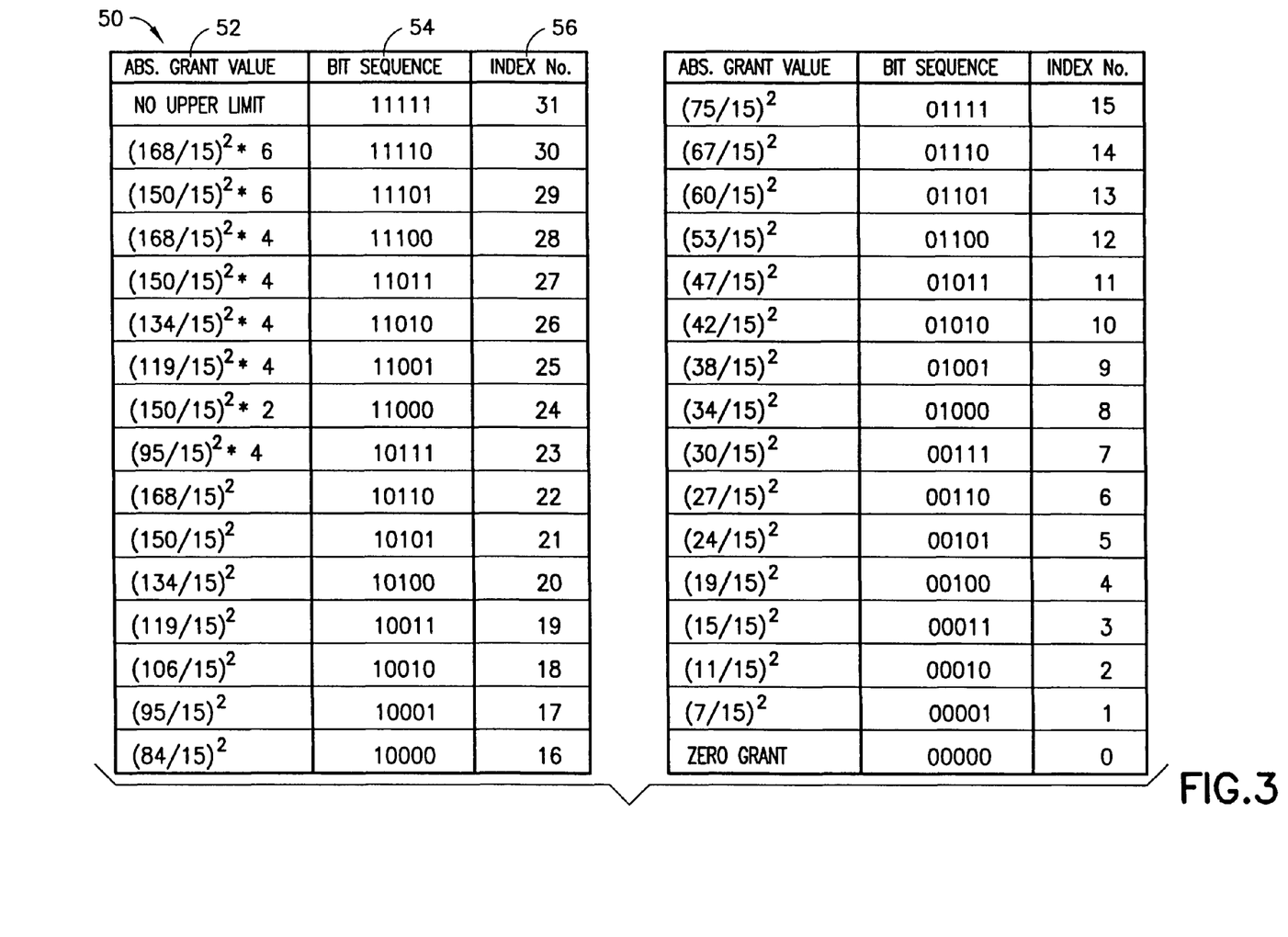
FIG. 3 shows an exemplary lookup table according to an embodiment of the invention that may be stored in the UE and Node B, but with an additional index number column for convenience of the below description.

A non-limiting implementation utilizes only the E-AGCH bits that are used to send the maximum E-DPDCH/DPCCH power ratio. The RNC 10, BTS 30, and/or the MS 40 may store in a computer readable memory 46 a lookup table such as that shown in FIG. 3, which illustrates a single lookup table 50 that is parsed into two sections for illustration on a single drawing sheet. The table 50 uniquely associates a power value 52 with a unique bit sequence 54. The lookup table is used for simplicity of illustration; the substantive data may be stored by a lookup table, an algorithm to generate the appropriate values, or other data storage format. An additional index number 56 is shown for each association for ease of explanation. Each bit sequence 54 in the lookup table 50 of FIG. 3 includes five bits, for ease of adaptation of elements of this invention with current 3GPP 25-series specifications. As was previously noted, each of these five-bit sequences in the prior art is associated with a power control ranging from −10 dB to +21 dB. In FIG. 3, the table 50 is modified so that one bit sequence, indicated by index 0, is associated with a zero power allocation. Further, the table 50 is modified so that another bit sequence, indicated by index 31, is associated with a full power allocation, where the MS 40 is not restricted on the upside in its power allocation from the network. A full power allocation may be interpreted to mean that MS 40 is not restricted in its power level for the uplink data channel, or that the MS 40 is commanded to transmit on the uplink data channel at its maximum power level. The table 50 may include only either or both of the zero allocation and the full power allocation. Alternatively, the association of power values 52 with the bit sequences 54 may be by a stored algorithm that generates the values and bit sequences rather than a lookup table 50. Other embodiments for associating the data strings 52, 54 with one another may also be used. Should we also say that the zero power bit sequence does not have to be the one indicated by index 0?

Note that all other associations of bit sequence 54 to power value 52 in the table 50 are relative power values. These power values 52 are multiplied by the power on some other channel (such as the DPCCH) to arrive at the power level allocation for the MS's 40 transmissions on the uplink data channel (such as the E-DPDCH). In that manner, those power values are relative; they define a power relative to another power. The power values for the zero grant at index 0, and for the no upper limit grant at index 31, are independent of the power on the DPCCH. The full power allocation of index 31 commands the mobile station to transmit at its full power capability, which is independent of the power on the DPCCH or any other channel. A software limitation to the MS's 40 maximum capable power, apart from software implementing some signaling protocol but rather one that upwardly bounds the MS signal power output, may be considered to define that maximum capable power.

In view of FIG. 3, the MS 40 transmits on the uplink a control message 60 on a control channel, illustrated as DPCCH. Various prior art approaches may be used to determine the power for transmission of the control message 60, such as closed loop, open loop, or hybrids. The manner in which power is determined for the uplink control message 60 is not relevant to this invention, but consider that the network BTS 30 sends a command to the MS 40 as to what that power setting should be. The BTS 30 receives the uplink control message 60 and determines, from analysis of the received power of that message 60, what the desired transmit power on the traffic channel should be for that MS 40. The BTS 40 then accesses its lookup table 50 stored in its memory, determines the ratio (e.g., the absolute grant value 52) to achieve the desired transmit power, and selects the bit sequence associated with that grant value 52. The BTS 30 transmits to the MS 40 a power control message 62 or command that includes the selected bit sequence. Note that the power control message is on the E-AGCH in FIG. 2, though it may be on any downlink channel.

The MS 40 receives the bit sequence from the power control message 62, uses it to access its own locally stored table 50 or algorithm to select one grant value 52, and sets its power for uplink transmission of user data 64 on the dedicated traffic channel (shown as E-DPDCH). If the bit sequence of the power control message 62 is for a full power allocation, the MS 40 sets its gain accordingly. If the bit sequence of the power control message 62 is for a zero power allocation, the MS 40 suspends any scheduled transmissions on the uplink dedicated traffic channel and awaits a non-zero power allocation from the BTS 30. In the regimen of 3GPP 25-series specifications, that non-zero power allocation may be a new absolute grant on the E-AGCH. A zero power allocation causes the MS 40 to suspend uplink transmissions on the requisite traffic channel until a new non-zero allocation is received from the network.

One variation on the teachings of FIG. 3 is that the zero power allocation and/or the full power allocation may be enabled also or alternatively on the relative grant channel E-RGCH. Though it is anticipated that future modifications to 3GPP TS 25.321 would disallow a transition from zero to non-zero power by a relative grant, such an embodiment remains within embodiments of this invention. Recall that the relative grant commands UP/KEEP/DOWN according to a uniform 1 dB granularity in the current system signaling protocol. One or two additional commands may be added: a DOWN TO ZERO command and/or an UP TO FULL command. Regardless of the power commanded on the absolute grant channel, a single adjustment on the relative grant channel could then change the MS's 40 power on the traffic channel uplink to either zero or full, rather than having to step individually through numerous UP or DOWN commands that will still only achieve the range of −10 dB and +21 dB from the power commanded on the absolute grant channel. Implementation is not fundamentally different: a specified bit pattern on the relative grant channel would indicate DOWN TO ZERO, and/or a (different) specified bit pattern on the relative grant channel would indicate UP TO FULL, to which the MS 40 would respond accordingly by either suspending transmissions on the traffic uplink or transmitting its user data on the traffic uplink with full power, respectively.

Figure 4:
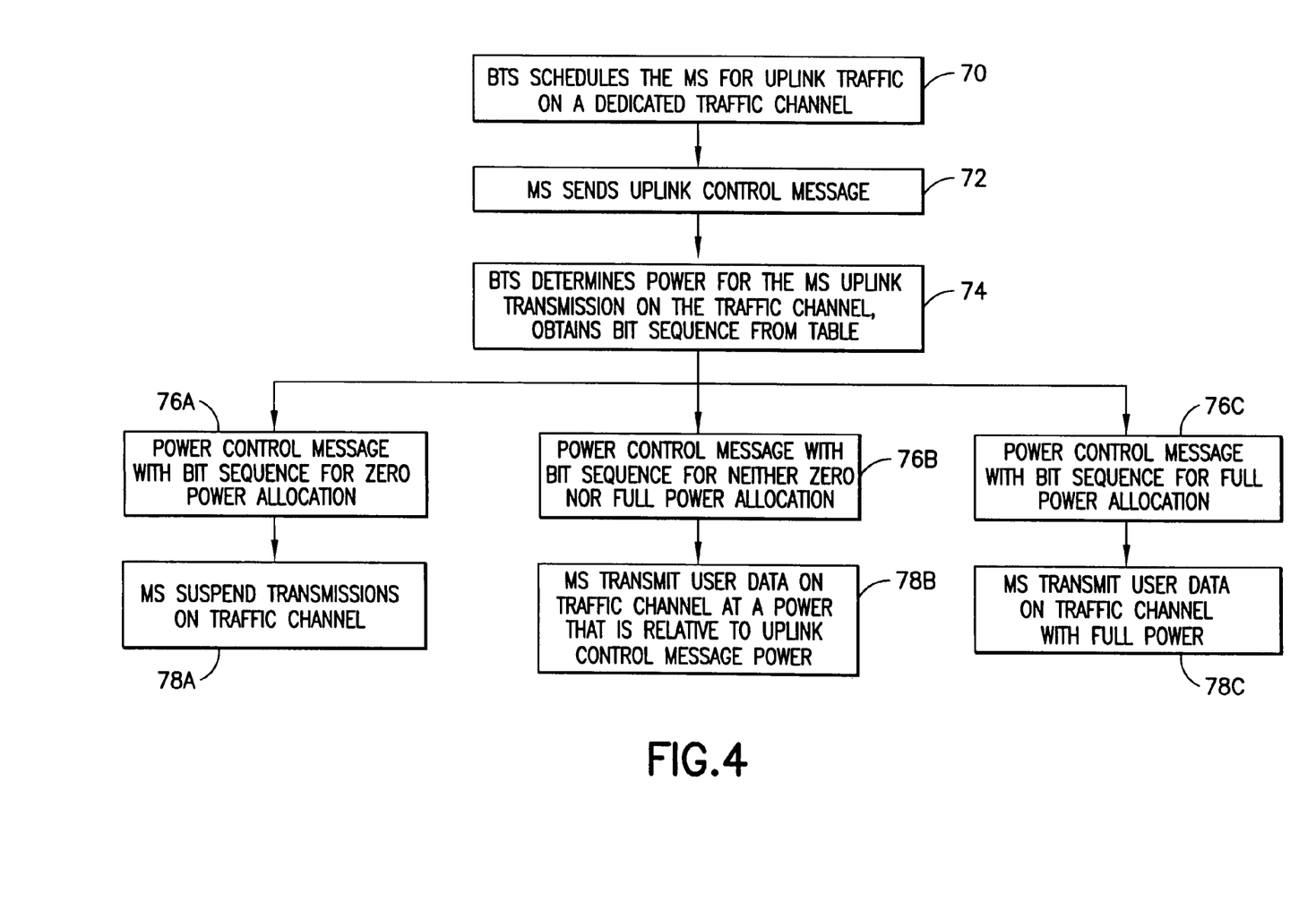
FIG. 4 is a process diagram showing steps according to an embodiment of the invention.

The process diagram of FIG. 4 begins with the step 70 of the BTS 30 scheduling the MS 40 for uplink traffic on a dedicated traffic channel. Alternatively, the RNC 10 may schedule as above. At step 72, the MS may send an uplink control message 60 such as on the DPCCH, at a first power setting or level. This uplink control message may be a request for a specific data rate on the dedicated traffic channel. The BTS 30 determines at step 74 an appropriate/desired power level for the MS 40 to transmit on the uplink traffic channel. In one embodiment, the determination at step 74 is done by detected power from the optional message at step 72. Note that the order of steps 70, 72 and 74 may vary; they need not be sequential where the relevant data is stored and not exceeding some coherence interval between the first power on the uplink control channel and eventual transmission at a second power (or suspension of transmission) by the MS 40 on the uplink traffic channel. The BTS 30 determines, such as from the table 50 of FIG. 3, an appropriate bit sequence. Where both zero and full power allocations are enabled, step 74 yields one of three possible results.

One result of step 74 is that the BTS 30 commands a zero power allocation in its power control message to the MS 40, at step 76A. As above, that power control message may be on the absolute grant channel or on the relative grant channel. At step 78A, the MS 40 reads the zero power allocation and suspends transmissions on the dedicated traffic channel for which it was scheduled in step 70. As used herein, suspending transmissions does not require a previous transmission, only a previous scheduling of that MS 40 for transmission.

A second possible result of step 74 is that the BTS 30 commands a full power allocation in its power control message to the MS 40, at step 76C. As above, that power control message may be on the absolute grant channel or on the relative grant channel. At step 78C, the MS 40 reads the full power allocation and transmits user data on the dedicated traffic channel for which it was scheduled in step 70 at full power.

The third possible result of step 74 is at step 76B, where the BTS 30 commands a power allocation that is relative to the power used on the uplink control message of step 72, and hence is a command for neither full nor zero power and not fundamentally different than the prior art. Such a power command is indicated in FIG. 3 by any of the indices 1 through 30. As above, that power control message may be on the absolute grant channel or on the relative grant channel. At step 78B, the MS 40 reads the relative power allocation and transmits user data on the dedicated traffic channel for which it was scheduled in step 70 at a power that is relative to that with which it transmitted at step 72, as determined by the table and the power control message.

Where the BTS 30 also includes the packet scheduler function 32, embodiments of this invention such as those detailed above more efficiently allocate radio resources. However, the invention may also be practices where the RNC 10 retains the packet scheduler function and signals the BTS 30 when the MS 40 is scheduled to transmit on the uplink traffic channel. While the additional delays in signaling between the RNC 10 and the BTS 30 are less efficient, such an embodiment still benefits from the zero and/or full power allocations enabled by this invention.

It should be noted that depending on the actual implementation of the E-AGCH that bits other than the E-DPDCH/DPCCH power ratio signaling bits may be used to convey one or both of the 'zero allocation' and 'fill allocation' indications to the UE 40. The five bits shown in FIG. 3 are seen as the most seamless integration into current signaling protocol for 3GPP 25-series specifications.

In one embodiment, a network element such as the BTS 30 transmits to the UE/MS 40 a message 62 that commands one of a zero power allocation (e.g., index 0) or a full power allocation (e.g., index 32) for a scheduled uplink packet transmission 64. Advantageously the BTS 30 also schedules that uplink transmission 64 for the MS 40, but the RNC 10 may do so instead. Consider that the message 62 specifically includes a first bit sequence 54. The BTS 30 selects the first bit sequence from a stored lookup table 50 that associates the first bit sequence with the one of zero power allocation (e.g., index 0) or full power allocation (e.g., index 31). It is notable that the lookup table 50 further associates a second bit sequence 54 (e.g., any of indices 1 through 30) with an explicit non-zero power allocation 54 relative to power on a channel other than the wireless data channel (e.g., DPDCH). In the table 50 of FIG. 3, indices 1 through 30 are each explicit and non-zero relative to power on the control channel because power on that control channel must be non-zero in order for the BTS 30 to determine a value 54 based on a ratio of that control channel power. The table 50 in the BTS 30 may have only a zero allocation associated with a bit sequence, only a full allocation associated with a bit sequence, or both.

Embodiments of the invention may lie in software, a program of machine-readable instructions that are tangibly embodied on an information bearing medium and executable by a digital data processor to perform actions directed toward providing a power control to a mobile station. Such software embodiments cause the processor 44, after scheduling a UE/MS 40 for an uplink packet transmission on a wireless data channel, to access a stored lookup table 50 to determine a bit sequence 54 that is associated with a zero power allocation or with a full power allocation, and then to transmitting to the UE/MS 40a power control message 62 for the scheduled uplink transmission 64 that includes the determined bit sequence 54. Note that the processor 44 need not schedule the UE/MS 40, but that accessing the lookup table 50 occurs subsequent in time to that scheduling (which may be done in the BTS 30 or in the RNC 10).

Still considering the network-related embodiments, an apparatus such as the BTS 30 may practice an embodiment of the invention with means for storing an association of bit sequences 54 with power allocations 52, wherein a first bit sequence is associated with either a zero power allocation or a full power allocation and a second bit sequence is associated with an explicit non-zero power allocation. As detailed above, this means for storing may be any computer readable storage medium 46, such as optical, electronic, magnetic, or other technology; the type of storage medium is not a novel aspect of the invention. The associations may be stored as a lookup table 50, which may or may not store both zero allocation and full allocation bit sequences. This network element would also have means for transmitting, in a power control message 62, the first bit sequence to command a UE/MS 40 of a power allocation for an uplink data channel. The means for transmitting may be embodied as a transceiver 42 coupled to a processor 44 and to the computer readable storage medium 46 for compiling the power control message 62 to include the first bit sequence 54. The first bit sequence, whether for zero or full power allocation, is selected based in part on power of a control channel. This is not to mandate that the first bit sequence recites a ratio of uplink traffic power to uplink control power, but merely that the BTS 30 bases its power control message 62 oil the power used in the uplink control channel. Without knowing power on the control channel, the BTS 30 could not reliably determine whether to allocate zero power or full power to the US/MS 40.

Turning now to the MS 40 aspects of the invention, in some embodiments the MS 40 receives from a network element such as the BTS 30 a power control command 62 for uplink transmissions 64 on a data channel. The MS 40 determines from that power control command 62 one of a zero power allocation or a full power allocation. Note that the MS 30 need not be capable of determining both zero and full power allocations; the table 50 may include only one of them or both. If the determined power allocation is a zero power allocation, the MS 40 suspends transmissions 64 on the data channel until receiving a new power control command for uplink transmissions on the data channel. As noted above, the new power control command may come in the same manner as the first-described power control command 62, or it may come in a different manner such as an UP command on the relative grant channel (though it is anticipated that future revisions to 3GPP TS 25.321 would disallow an UP command from a zero power allocation on the E-RGCH). If the MS 40 determines that the power allocation is a full power allocation, it transmits user data 64 on the data channel without regard to power on a control channel. Where the MS 40 uses a lookup table 50, it may be identical to that used in the BTS 30, with all the variances noted above.

The MS-oriented aspects of the invention may also be embodied in software as a program of machine-readable instructions, that are tangibly embodied on an information bearing medium and executable by a digital data processor, to perform actions directed toward controlling transmission power in a MS 40. In this regard, the mobile station receives from a network element such as a BTS 30 a power control command 62 for uplink transmissions 64 on a data channel. The software determines from the power control command 62 one of a zero power allocation or a full power allocation. If a zero power allocation, the software causes the MS 40 to suspend transmissions on the data channel until receiving a new power control command for uplink transmissions 64 on the data channel. Alternatively, if the determined power allocation is a full power allocation, then the software causes the MS 40 to transmit user data 64 on the data channel without regard to power on a control channel.

In some embodiments, the MS 40 may include a transceiver 42 coupled to a data processor 44 and a memory 46 for storing a lookup table 50 and computer instructions executable by the data processor 44. Upon receipt of a power control command 62 for uplink transmissions on a data channel, the executable computer instructions are for causing the processor 44 to determine from the power control command 62 and the memory 46 one of a zero power allocation or a full power allocation. If a zero power allocation is determined, then transmissions on the data channel are suspended until receiving a new power control command for uplink transmissions 64 on the data channel. If a full power allocation is determined, then user data 64 is transmitted on the data channel without regard to power on a control channel.

The non-network embodiments of the invention may be an apparatus that has means for storing an association of a first bit sequence with either a zero power allocation or a full power allocation. This means for storing may also be a computer readable memory 46 as above for storing the table 50 detailed above. This apparatus would also include means for accessing the means for storing with the first bit sequence received in a power control message, by which to determine either a zero power allocation or a full power allocation for uplink transmissions 64 on a data channel. If the determined power allocation is a zero power allocation, the apparatus has means for suspending transmissions on the data channel until receiving a new power control command for uplink transmissions on the data channel. If the determined power allocation is a full power allocation, the apparatus has means for transmitting user data on the data channel without regard to power on a control channel. Either of the means for suspending transmissions or the means for transmitting might include the processor 44 coupled to a transceiver 42.

The 'full allocation' is beneficial when the UE is close to the Node B and may transmit with a higher than +21 dB power offset. However, prior to this invention the Node B scheduler 32 (or the RNC 10 scheduler) did not have a means available to allow for a higher power offset.

Based on the foregoing description of the exemplary embodiments of this invention it can be appreciated that an aspect of this invention relates to a method, apparatus and a computer program to operate a network element 30 to signal at least one of a 'zero allocation' and 'full allocation' indication to a UE 40. In a non-limiting embodiment the at least one of the 'zero allocation' and 'full allocation' indications are signaled using a selected one or ones of E-AGCH E-DPDCH/DPCCH power ratio signaling bits 54. In a non-limiting embodiment the selected ones of the E-AGCH E-DPDCH/DPCCH power ratio signaling bits are the smallest power ratio index (e.g., the bit sequence 00000 as illustrated) and the largest power ratio index (e.g., the bit sequence 11111 as illustrated) for signaling 'zero allocation' and 'full allocation' indications, respectively.

Based on the foregoing description of the exemplary embodiments of this invention it can be further appreciated that another aspect of this invention relates to a method, apparatus and a computer program to operate a UE/MS 40 to respond to signaling 62 that indicates at least one of a 'zero allocation' and 'full allocation' indication to set its uplink 64 transmission power accordingly. In a non-limiting embodiment the at least one of the 'zero allocation' and 'full allocation' indications are signaled to and recognized by the UE/MS 40 using a selected one or ones of E-AGCH E-DPDCH/DPCCH power ratio signaling bits 54. In a non-limiting embodiment the selected ones of the E-AGCH E-DPDCH/DPCCH power ratio signaling bits are the smallest power ratio index (e.g., the bit sequence 00000) and the largest power ratio index (e.g., the bit sequence 11111 as illustrated) for signaling 'zero allocation' and 'full allocation' indications, respectively.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings. As but some examples, the use of other specific signaling bits (which may or may not otherwise be used to indicate power relative to another power) and other/or types of signaling messages may be attempted by those skilled in the art. Further, it is within the scope of the teachings of this invention to use the E-AGCH to signal at least one of the indications of the 'zero allocation' and 'full allocation' to the UE 40. However, all such and similar modifications of the teachings of this invention will still fall within the scope of this invention.

Furthermore, some of the features of the examples of this invention may be used to advantage without the corresponding use of other features. For example, the 'zero allocation' feature may be used without the use of the 'no power ratio limitation', and vice versa. As such, the foregoing description should be considered as merely illustrative of the principles, teachings, examples and embodiments of this invention, and not in limitation thereof.

The embodiments of this invention may be implemented by computer software executable by a data processor 44 of the MS 40 or of the BTS 30 or of the BTS 30 in combination with the RNC 10 or some other host device, such as by hardware, or by a combination of software and hardware. Further in this regard it should be noted that the various blocks of the logic flow diagram of FIG. 4 may represent program steps, or interconnected logic circuits, blocks and functions, or a combination of program steps and logic circuits, blocks and functions.

The memory or memories 46, whether in the MS 40, BTS 30 or RNC 10, may be of any type suitable to the local technical environment and may be implemented using any suitable data storage technology, such as semiconductor-based memory devices, magnetic memory devices and systems, optical memory devices and systems, fixed memory and removable memory. The data processor 44 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components Such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method for operating a network element comprising:
   scheduling a user equipment for an uplink packet transmission on a wireless data channel;
   selecting a zero power allocation from a plurality of power allocations, each of the plurality of the power allocations corresponding to a unique bit sequence, one of the unique bit sequences being associated with the zero power allocation and a remainder of the unique bit sequences being associated with data channel/control channel power ratios; and
   transmitting to the user equipment a power control message that includes the selected zero power allocation for the scheduled uplink packet transmission.

2. The method of claim 1, the method further comprising: determining the unique bit sequence from a stored lookup table or algorithm.

3. The method of claim 2 wherein the unique bit sequence comprises E-DPDCH/DPCCH power ratio signaling bits.

4. The method of claim 2, wherein the lookup table or algorithm further comprises another bit sequence associated with a full power allocation that commands transmission on the data channel at a maximum capable power.

5. The method of claim 1, wherein transmitting to the user equipment a message comprises transmitting on an absolute grant channel, and the wireless data channel comprises an enhanced dedicated transport channel.

6. The method of claim 1, wherein both scheduling and transmitting are by a base transceiver station.

7. A computer readable storage medium embodied with a computer program that is executable by a digital data processor, to perform actions comprising:
    after scheduling a user equipment for an uplink packet transmission on a wireless data channel, selecting a zero power allocation from a plurality of power allocations, each of the plurality of the power allocations corresponding to a unique bit sequence, one of the unique bit sequences being associated with the zero power allocation and a remainder of the unique bit sequences being associated with data channel/control channel power ratios, and accessing a data storage medium to determine a unique bit sequence that is associated with the zero power allocation; and
    transmitting to the user equipment a power control message for the scheduled uplink transmission that includes the determined bit sequence.

8. The computer readable storage medium of claim 7, wherein the determined unique bit sequence is determined from a stored lookup table or algorithm.

9. The computer readable storage medium of claim 8, wherein the unique bit sequence comprises E-DPDCH/DPCCH power ratio signaling bits.

10. The computer readable storage medium of claim 8, wherein the data storage medium comprises further comprises another bit sequence associated with a full power allocation that commands transmission on the wireless data channel at a maximum capable power.

11. The computer readable storage medium of claim 7, wherein transmitting comprises transmitting the power control message on an absolute grant channel, and the wireless data channel comprises an enhanced dedicated transport channel.

12. A network element comprising:
    a transceiver configured to provide communications to and from a data processor and a memory for storing a data association and computer instructions executable by the data processor, wherein:
    the data association comprises an association of a first bit sequence with a zero power allocation from a plurality of power allocations, each of the plurality of the power allocations corresponding to a unique bit sequence, one of the unique bit sequences being associated with the zero power allocation and a remainder of the unique bit sequences being associated with data channel/control channel power ratios; and
    the executable computer instructions are for causing the transceiver to send a power control message comprising the first bit sequence to a user equipment that is scheduled for uplink packet transmission on a wireless data channel.

13. The network element of claim 12, wherein the data association is through a stored lookup table or algorithm.

14. The network element of claim 13, wherein the unique bit sequence comprises E-DPDCH/DPCCH power ratio signaling bits.

15. The network element of claim 13, wherein the data association further comprises another bit sequence associated with a full power allocation that commands transmission on the wireless data channel at a maximum capable power.

16. The network element of claim 12, wherein the power control message is sent on an absolute grant channel, and the wireless data channel comprises an enhanced dedicated transport channel.

17. The network element of claim 12, wherein the executable computer instructions are further for scheduling the user equipment for the uplink packet transmission on the wireless data channel.

18. An apparatus comprising:
    means for storing an association of bit sequences with power allocations, wherein a first bit sequence is associated with a zero power allocation and a second bit sequence is associated with a relative power allocation, the zero power allocation being one of a plurality of power allocations, each of the plurality of the power allocations corresponding to a unique bit sequence, one of the unique bit sequences being associated with the zero power allocation and a remainder of the unique bit sequences being associated with data channel/control channel power ratios; and
    means for transmitting, from the apparatus, in a power control message the first bit sequence to command a user equipment to transmit with a zero power allocation for a wireless uplink data channel.

19. The apparatus of claim 18, wherein:
    the means for storing comprises a computer readable storage medium; and
    the means for transmitting comprises a transceiver configured to provide communications to and from a processor and to the computer readable storage medium for compiling the power control message to include the first bit sequence which is selected based in part on power of a control channel, and for wirelessly sending the message on an absolute grant channel.

20. A method for operating a mobile station comprising:
    receiving from a network element a power control command for uplink transmissions on the wireless uplink data channel;
    determining from the power control command a zero power allocation, the zero power allocation being one of a plurality of power allocations available from the network element, each of the plurality of the power allocations corresponding to a unique bit sequence, one of the unique bit sequences being associated with the zero power allocation and a remainder of the unique bit sequences being associated with data channel/control channel power ratios; and
    responsive to determining, suspending transmissions on the wireless data channel until receiving a new power control command for uplink transmissions on the wireless data channel.

21. The method of claim 20, wherein determining comprises accessing a stored lookup table or algorithm that associates a unique bit sequence with a corresponding power allocation.

22. The method of claim 21, wherein the unique bit sequence comprises E-DPDCH/DPCCH power ratio signaling bits.

23. The method of claim 21, wherein the lookup table or algorithm further comprises another bit sequence associated with a full power allocation that commands transmission on the wireless data channel at a maximum capable power.

24. The method of claim 23, wherein the another bit sequence commands transmitting user data at a mobile station maximum capable power.

25. The method of claim 20, wherein the power control command is received on an absolute grant channel, and the wireless data channel comprises an enhanced dedicated transport channel.

26. A computer readable storage medium embodied with a computer program that is executable by a digital data processor, to perform actions comprising:
  receiving at a mobile station from a network element a power control command for uplink transmissions on a wireless data channel;
  determining from the power control command a zero power allocation, the zero power allocation being one of a plurality of power allocations available from the network element, each of the plurality of the power allocations corresponding to a unique bit sequence, one of the unique bit sequences being associated with the zero power allocation and a remainder of the unique bit sequences being associated with data channel/control channel power ratios; and
  responsive to determining, suspending transmissions on the wireless data channel until receiving a new power control command for uplink transmissions on the wireless data channel.

27. The computer readable storage medium of claim 26, wherein determining comprises accessing a stored lookup table or algorithm that associates a unique bit sequence with a corresponding power allocation.

28. The computer readable storage medium of claim 27, wherein the unique bit sequence comprises E-DPDCH/DPCCH power ratio signaling bits.

29. The computer readable storage medium of claim 27, wherein the lookup table or algorithm further comprises another bit sequence associated with a full power allocation that commands transmission on the wireless data channel at a maximum capable power.

30. The computer readable storage medium of claim 26, wherein the power control command is received on an absolute grant channel, and the wireless data channel comprises an enhanced dedicated transport channel.

31. The computer readable storage medium of claim 26, wherein the another bit sequence commands transmitting user data at a mobile station maximum capable power.

32. A mobile station comprising:
  a data processor;
  a memory configured to store a data association and computer instructions executable by the data processor;
  a transceiver configured to provide communications to and from the data processor, wherein:
  upon receipt of a power control command for uplink transmissions on a wireless data channel, the executable computer instructions are configured to cause the processor to determine from the power control command and the memory a zero power allocation selected by a network element, wherein the zero power allocation is one of a plurality of power allocations, each of the plurality of the power allocations corresponding to a unique bit sequence, one of the unique bit sequences being associated with the zero power allocation and a remainder of the unique bit sequences being associated with data channel/control channel power ratios; and
  responsive to the determining, suspending transmissions on the wireless data channel until receiving a new power control command for uplink transmissions on the wireless data channel.

33. The mobile station of claim 32, wherein the processor is configured to determine a power allocation by accessing the stored data association that associates a unique bit sequence with a corresponding power allocation, wherein the stored data association is in the form of a lookup table or an algorithm.

34. The mobile station of claim 33, wherein the unique bit sequence comprises E-DPDCH/DPCCH power ratio signaling bits.

35. The mobile station of claim 33, wherein the lookup table or algorithm further comprises another bit sequence associated with a full power allocation that commands transmission on the wireless data channel at a maximum capable power.

36. The mobile station of claim 32, wherein the power control command is received on an absolute grant channel, and the wireless data channel comprises an enhanced dedicated transport channel.

37. The mobile station of claim 32, wherein another bit sequence commands the mobile station to transmit user data at its maximum capable power.

38. An apparatus comprising:
  means for storing an association of a first bit sequence with a zero power allocation;
  means for accessing the means for storing with the first bit sequence received in a power control message on an absolute grant channel to determine the zero power allocation for uplink transmissions on a wireless data channel;
  means for receiving a selected zero power allocation in the power control message from a network element, wherein the selected zero power allocation is one of a plurality of power allocations available from the network element, each of the plurality of the power allocations corresponding to a unique bit sequence, one of the unique bit sequences being associated with the zero power allocation and a remainder of the unique bit sequences being associated with data channel/control channel power ratios; and
  responsive to determining, means for suspending transmissions on the wireless data channel until receiving a new power control command for uplink transmissions on the wireless data channel.

39. The apparatus of claim 38, wherein:
  the means for storing comprises a computer readable storage medium;
  the means for determining comprises a processor configured to communicate with the storage medium; and
  the means for suspending transmissions comprises the processor and a transceiver.

40. A method of allocating transmission power to a mobile station comprising:
  in a network,
    scheduling a mobile station for an uplink packet transmission on a wireless data channel;
    receiving from a mobile station an uplink message on a control channel;
    determining from the uplink message a desired zero power for the mobile station to transmit on the wireless data channel;
    selecting a zero power allocation from a plurality of power allocations, each of the plurality of the power allocations corresponding to a unique bit sequence, one of the unique bit sequences being associated with the zero power allocation and a remainder of the unique bit sequences being associated with data channel/ control channel power ratios; and transmitting to the mobile station a power control message, via an absolute grant channel, that includes the selected zero power allocation for the scheduled uplink packet transmission;

in the mobile station:

receiving from the network the power control message on the absolute grant channel;

determining from the power control message the selected zero power allocation; and responsive to the mobile station determining, suspending transmissions on the wireless data channel until receiving a new power control command for uplink transmissions on the wireless data channel.

* * * * *